UNITED STATES PATENT OFFICE.

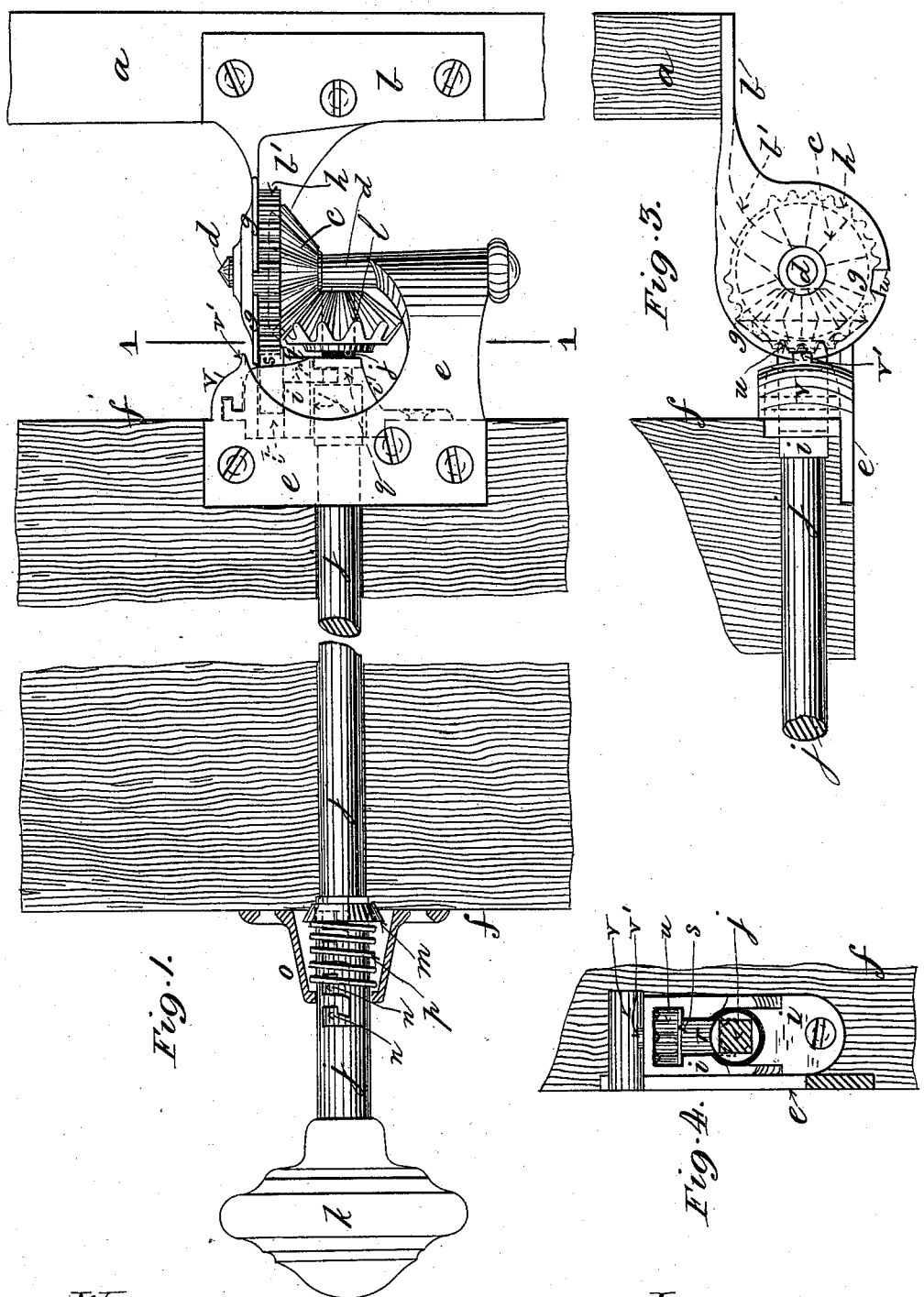

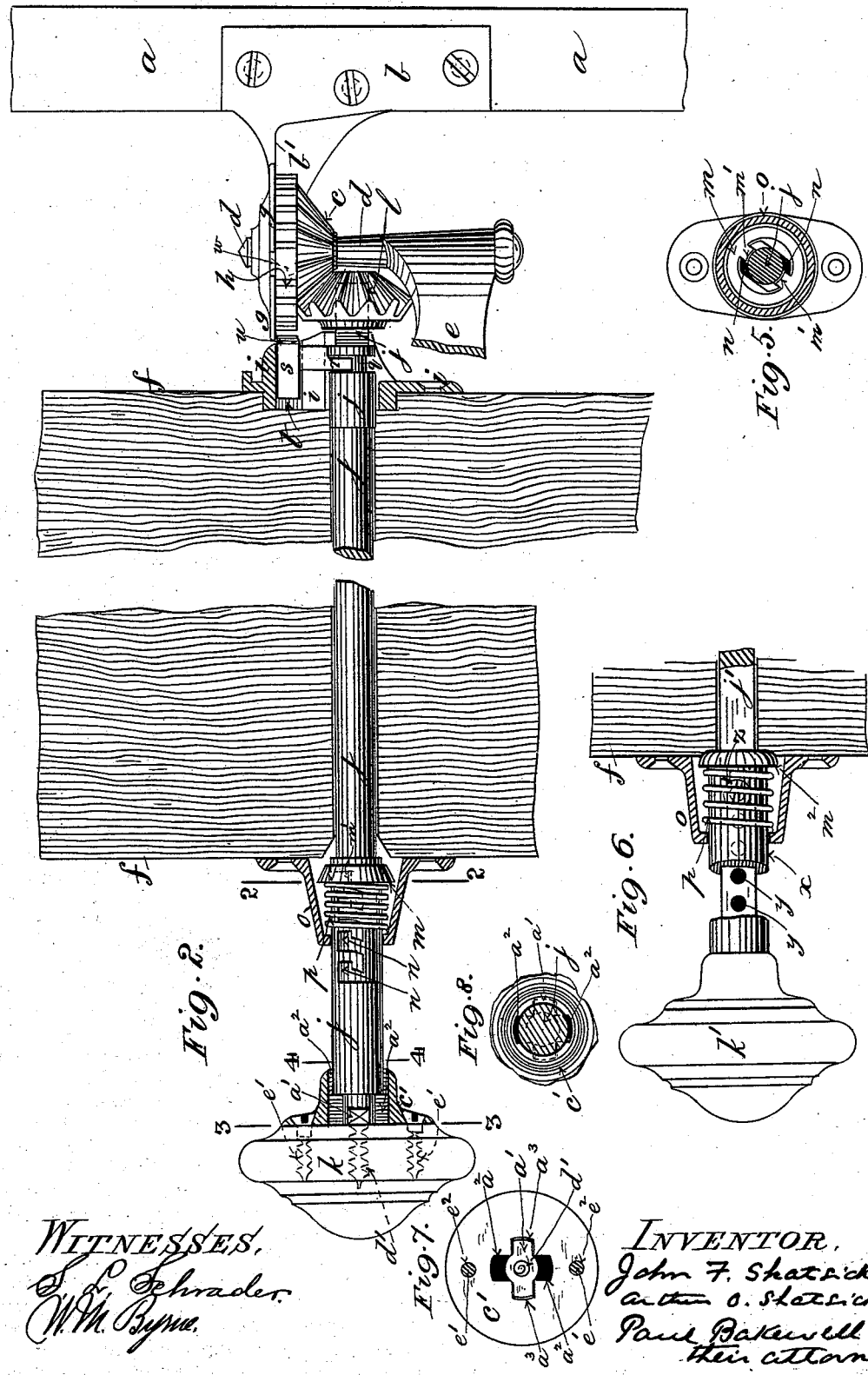

JOHN F. SHATSICK AND ARTHUR O. SHATSICK, OF ST. LOUIS, MISSOURI.

SHUTTER-WORKER.

SPECIFICATION forming part of Letters Patent No. 400,496, dated April 2, 1889.

Application filed December 17, 1888. Serial No. 293,829. (No model.)

*To all whom it may concern:*

Be it known that we, JOHN F. SHATSICK and ARTHUR O. SHATSICK, citizens of the United States, residing at the city of St. Louis, State of Missouri, have invented a certain new and useful Improved Means of Opening and Closing Window-Shutter Blinds, of which the following is a full, clear, and exact description.

Our invention relates to means for operating that class of outside window-shutter blinds which are opened and closed by bevel gearing and spindle from the inside of the window, and has for its object to automatically lock or hold the shutter-blind when in the open, closed, or intermediate position and to maintain the bevel-wheels in full gear.

Our invention consists in a bevel wheel or segment carried by the shutter-blind and engaged by a bevel-wheel fitted on and rotating with a spindle extending horizontally through the side of the window-frame; a collar carried by the spindle; a casing surrounding the collar and spindle thereat and containing a spiral spring located around the spindle between the collar and outer end of the casing; a bolt or catch having teeth and controlled by the spindle, so as to be thrown into or out of gear with a toothed spur wheel or segment carried by the bevel wheel or segment on the shutter-blind, and a knob or handle secured by an improved device to the end of the spindle within the building, the whole operating so that on pulling the spindle by its knob or handle the toothed bolt or catch is released from the spur-wheel on the shutter-blind, when, by turning the handle in either direction, the spindle is rotated, and by the action of the bevel-gear the shutter-blind opened or closed radially on its hinges. On releasing the handle the spindle is returned by the spiral spring to its original position, and throws the toothed bolt or catch into gear with the spur-wheel on the shutter-blind, so as to prevent any further rotation of the bevel-gear, and thereby lock the shutter-blind in any desired position.

Our invention also comprises means for preventing any vertical play of the shutter-blind on its hinges when operated by the bevel-wheels, and so maintaining the latter in full gear at all times.

On the accompanying drawings, Figure 1 represents a side sectional elevation of our invention applied to an outside shutter-blind when locked in the open position, broken away; Fig. 2, a similar view thereof omitting part of the window-frame hinge-bracket with the shutter-blind unlocked ready for being closed; Fig. 3, a plan of the shutter-blind, broken away, and its combined parts, as seen to the right of Fig. 1; Fig. 4, a transverse section on line 1 1 in Fig. 1, looking to the left hand and omitting the bevel-gear; Fig. 5, a transverse section on line 2 2 in Fig. 2; Fig. 6, a side sectional elevation showing a modification of parts of our invention, as seen to the left of Fig. 1; Fig. 7, a cross-sectional elevation on line 3 3 in Fig. 2; and Fig. 8, a similar view on line 4 4 in Fig. 2, broken away, like letters of reference denoting like parts in all the figures.

$a$ represents a window-shutter blind (broken away) provided with ordinary upper hinges (not shown) and with a lower hinged bracket, $b$, from which projects an upper arm, $b'$, carrying in a plane at right angles to the blind $a$ a bevel-toothed segment, $c$, which is mounted axially on the upper end portion of the upright hinge $d$, projecting from the opposite hinge-bracket $e$, the latter being secured to the window-frame $f$ in the usual manner. On the upper surface or back of the bevel-segment $c$ is a weather hood or covering, $g$, having on its under side a horizontally-arranged toothed spur wheel or segment, $h$, which is concentric with the bevel-segment $c$.

Within the window-frame $f$, adjacent and at right angles to the hinge-bracket $e$, is fixed a slotted box or casting, $i$, in which is mounted the rear portion of a spindle, $j$, extending horizontally through the upright of the window-frame $f$, from the outside of the latter to the interior of the building, where it terminates in a knob or handle, $k$.

The outer end of the spindle $j$, external to the casting $i$, is preferably square, and carries the vertically-arranged bevel-wheel $l$, which engages with the upper bevel-segment, $c$, these parts being so arranged and fitted that the spindle $j$ may be reciprocated longitudinally while rotating the bevel-wheel $l$, which is at the same time maintained in gear with the upper segment, c, and prevented from moving endwise with or along the spindle j by the outer face of the casting i.

Around the spindle j, at the inside of the window-frame f, is placed a loose ring or collar, m, (see also Fig. 5,) having inner projections, m', which lock into corresponding notches or recesses, n, formed at suitable distances apart along the circumference of the spindle j, whereby the extent of the latter between the bevel-wheel l and the inside of the window-frame f is adjusted to varying thicknesses of wall.

Inclosing the collar m and outlying portion of the spindle j is a casing, o, which is secured to and projects from the inside of the window-frame f. Within the casing o is placed around the spindle j, between the collar m and the inner shoulder on the projecting end of the casing o, a spiral spring, p, which normally presses the collar m toward the window-frame f.

In the rear portion of the spindle j, inclosed by the slotted box or casting i, is a circumferential groove, q, which receives the lower end portion of a tooth or projection, r, depending vertically from and secured to a bolt, s, which is mounted and capable of horizontal movement in guides t, formed on the insides of the casting i, the outer end of the bolt s having vertically-arranged teeth u, which, when the spindle j and collar m are in their normal positions, as before named, engage with the teeth of the spur wheel or segment h on the window-shutter a, as seen in Figs. 1 and 3.

In operation, assuming the various parts to be in the relative positions seen in Fig. 1— that is to say, the spindle j in its extreme outward position, with the bolt s having its teeth u in gear with the toothed spur wheel or segment h on the window-shutter a, which is thereby locked in the open position, on pulling the spindle j by its handle k into the position seen in Fig. 2 the spiral spring p is compressed by the collar m against the projecting end of the casing o, at the same time the groove q, acting on the tooth or projection r, constrains the bolt s along its guides t toward the window-frame f, so that its teeth u are withdrawn from the toothed spur-segment h on the window-shutter a, and the latter thereby unlocked, when, by partially rotating the spindle j to the left by its handle k, the bevel-wheel l rotates the bevel-segment c, and so closes the shutter a radially on its hinges to any desired extent. On releasing the handle k the spiral spring p returns the spindle j to its original position, which throws the bolt s into gear with the spur-segment h, so as to prevent any further rotation of the bevel-gear c l, and thereby lock the shutter a in the desired position. For opening the shutter a, the spindle j is again pulled into the position seen in Fig. 2 and rotated by its handle k to the right.

The great advantage of our invention is, that the shutter-blind a may be automatically locked from the inside of the window in the closed or open or any intermediate position, so that it cannot be moved from the outside.

Projecting from the top of the screw-plate of the hinge-bracket e, at right angles thereto along the adjacent face of the window-frame f, is a cap or hood, v, Figs. 1, 3, and 4, which extends across the top of the box or casting i, for protecting the bolt s from ice and snow. On the outer edge of the cap v is a projecting lug or ear, v', which overlaps the periphery of the weather-covering g on the bevel-segment c, for preventing the rising of the shutter-blind a on its wheel d during the operation of the bevel-wheel l, which is thereby maintained in full gear with the bevel-segment c, a gap, w, being formed through the rim of the weather-covering g, for enabling the bevel-segment c to be placed in position on its hinge d.

If desired, in lieu of the collar m, having projections m', for locking on the spindle, j, as in Figs. 1, 2, and 5, we may form or attach the collar $m^2$ (see Fig. 6) to the end of a tube, x, which projects through the casing o, and constitutes the shank of the handle k', the spiral spring p being placed around the tube x, between the collar $m^2$ and projecting end of the casing o, as in Fig. 1. Within the preferably square interior of the tube x is inserted the corresponding end portion of the spindle j', having a series of holes, y, which are located at suitable distances apart, so that when the spindle j' is properly adjusted to the locked position of the shutter-blind, with the collar $m^2$ in proximity to the window-frame f, the tube x may be fixed to the spindle j' by a countersunk screw, z, which enters one of the holes y, according to the varying thicknesses of the window-frame f.

For securing the handle k to the spindle j the latter is formed (see Figs. 2, 7, and 8) with a T-shaped end, a', which is passed through a corresponding slotway, $a^2$, in the flange c', and when clear of the face of the latter the T-shaped end a' is partially rotated and drawn backward, so as to engage in opposite recesses $a^3$, formed in the face of the flange c' at any suitable angle to the slotway $a^2$, whereby the flange c' is prevented from rotating on but constrained to rotate with the spindle j. From the T-shaped end a' projects axially with the spindle j a screw, d', onto which the knob or handle k is screwed hard against the face of the flange c', and finally secured to the latter by screws e', which are passed into the handle k through holes $e^2$ in the flange c'. By this means the handle k is firmly secured to the spindle j and all play or working loose of the parts prevented.

We claim—

1. In mechanism for opening and closing window-shutters, the combination of a longitudinally-movable spindle mounted horizontally within the window-frame and provided with a handle, a bolt operated by said spindle, and which is normally held in gear with a toothed spur wheel or segment on the shutter by a spiral spring located between a collar adjustably fixed to the spindle, a shoulder or fulcrum projecting from the window-frame, and a bevel-wheel fixed on said spindle with the bevel-wheel segment carried by the shutter, substantially as described.

2. The combination of a bevel wheel or segment, $c$, carried by hinged shutter-blind $a$, and engaged by bevel-wheel $l$ on spindle $j$, mounted in window-frame, and having adjustable ring or collar $m$, and spiral spring $p$, inclosed by casing $o$, groove $q$ in spindle $j$, bolt $s$, having projection $r$ and teeth $u$, and mounted between guides in window-frame, and spur wheel or segment $h$ on bevel-segment $c$, with knob or handle $k$, substantially as shown, and for the purpose described.

3. The combination of spindle $j$, having T-shaped end $a'$, and screw $d'$, flange $c'$, having thoroughfare-slotway $a^2$, recesses $a^3$, and holes $e^2$, with knob or handle $k$, and screws $e'$, substantially as shown, and for the purpose described.

4. The combination of spindle $j$, having T-shaped end $a'$, flange $c'$, having thoroughfare-slotway $a^2$, and recesses $a^3$, with means for securing said flange to a knob or handle, substantially as described.

In testimony whereof we affix our signatures, in presence of two witnesses, this 13th day of December, 1888.

JOHN F. SHATSICK.
ARTHUR O. SHATSICK.

Witnesses:
S. L. SCHRADER,
PAUL BAKEWELL.